F. A. STERRY.

MEANS FOR ADJUSTING SPINDLES IN RING SPINNING MACHINES.

No. 6,765. Reissued Nov. 23, 1875.

Witnesses.
S. W. Pifer
L. N. Hollar

Francis A. Sterry
by his attorney.
R. H. Eddy

N. PETERS, PHOTO-LITHOGRAPHER, WASHINGTON, D. C.

UNITED STATES PATENT OFFICE.

FRANCIS A. STERRY, OF CANTON, MASSACHUSETTS.

IMPROVEMENT IN MEANS FOR ADJUSTING SPINDLES IN RING SPINNING-MACHINES.

Specification forming part of Letters Patent No. 60,802, dated January 1, 1867; reissue No. 6,765, dated November 23, 1875; application filed June 15, 1875.

*To all whom it may concern:*

Be it known that I, FRANCIS A. STERRY, of Canton, in the county of Norfolk and State of Massachusetts, have invented a new and Improved Adjustable Spindle for Spinning-Frames; and I do hereby declare that the following is a full, clear, and exact description thereof.

The object of my invention is to obviate the difficulties which have hitherto been experienced in keeping plumb and concentric with the ring the spindle of ring spinning-frames, in consequence of the wearing away of the spindle bolster and step; and the invention provides for the adjustment of both the spindle-bolster and the spindle-step, and the securing them in any desired position, as will be hereinafter described.

To enable others skilled in the art to which my invention appertains to make and use it, I will proceed to describe its construction and operation, reference being had to the accompanying drawings, which form part of this specification, and to the letters of reference marked thereon.

Figure 1:
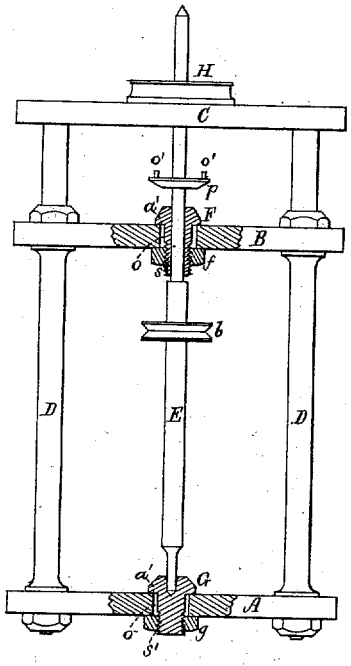
Figure 2:
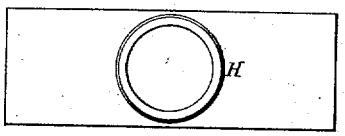

Of such drawings, Figure 1 represents a transverse section of my invention applied to a spinning-frame. Fig. 2 is a top view of the ring on the ring-rail.

Similar letters of reference indicate like parts.

A is the step-rail; B, the bolster-rail; C, the ring-rail; D D, the standards; and E the spindle. F is the bolster; G, the step; and H the ring. In this example of my invention, the ring-rail C is made fast to the top of the standards D D, which extend up through and above the bolster-rail for that purpose.

This arrangement is only for convenience in demonstrating my invention, as it is well known that the ring-rail is attached to lifting-rods, which give it a vertical motion when the frame is in use.

The difficulty which has hitherto been experienced has been in keeping the spindle plumb and in the center of the ring H, which is placed in or fixed to the ring-rail. This ring is usually secured in the rail by a set-screw. In order that the thread from the spindle may run in the proper direction, and to avoid extra labor, it is necessary that the spindle should stand plumb and in the center of the ring; otherwise the thread is liable to break, and the spinning is thereby interrupted. The band on the pulley *b*, by which the spindle is driven, is constantly pulling the spindle in one direction, and the bolster (which is the spindle-box) is consequently worn on one side only, and as the bolster wears the spindle is thrown out of plumb and out of the center of the ring. This makes the trouble and causes the extra labor. The same cause is constantly operating on the bottom end of the spindle, wearing the step on one side, and consequently throwing the spindle out of plumb and from the center of the ring, thereby causing the same trouble as before mentioned. Under these circumstances the usual remedy is to put in a new bolster or a new step, or both. Now, I obviate the difficulty without doing either, by simply adjusting the spindle to its true position, with the same bolster and the same step, in the following manner: The bolster F has a broad shoulder, *a'*, which rests upon the top of the rail B. The lower portion or part below the rail has a nut, *f*, screwed on it. That portion of the bolster which is in the hole *o* through the rail is made smaller in diameter than the hole, which allows the bolster to be moved and the spindle to be adjusted in any desired position, and when the spindle is placed in the center of the ring H, the bolster is secured in its place by the nut *f*. The step G is constructed in the same manner, with a shoulder to rest on the rail, and a nut, *g*, screwed on the part extending below the rail. The intermediate portion has room for adjustment in the hole *o* through the rail A, the same as the bolster in its rail B, and it is secured in its position in the same manner by a nut, *g*, screwed on the part projected below the rail A. The spaces around the bolster and around the step, which allow of this adjustment, are indicated in the drawing. *p* is a collar or flange on the spindle upon which the spool rests, and the pins *o'* enter the bottom end of the spool and couple the spool to the spindle. The bolster and step screws for receiving the fastening-nuts *f g* are represented at *s s'*.

Having thus described my invention, what I claim as new, and desire to secure by Letters Patent, is as follows:

1. In combination with the bolster F and the step G of a ring spinning-frame, means by which the plumbing of the spindle and its adjustment into concentricity with the ring may be effected, and the bolster and step be fixed in position after such adjustment, such means as described being the screws *s s'*, nuts *f g*, and shoulders *a' a'*, and holes *o o* of the bolster and step, all as and arranged as set forth.

2. In combination with the bolster and the step of the spindle of a ring spinning-frame, means or devices for adjusting them, so as to bring the spindle into concentricity with the ring.

FRANCIS A. STERRY.

Witnesses:
R. H. EDDY,
J. R. SNOW.